US012617186B2

(12) United States Patent
Stelzer et al.

(10) Patent No.: US 12,617,186 B2
(45) Date of Patent: May 5, 2026

(54) METHOD FOR ELECTRICALLY CONTROLLING A FUNCTIONAL ELEMENT EMBEDDED IN A GLAZING UNIT

(71) Applicant: SAINT-GOBAIN GLASS FRANCE, Courbevoie (FR)

(72) Inventors: Richard Stelzer, Düsseldorf (DE); Bastian Klauss, Kempen (DE); Doane Shelby Craig, Herzogenrath (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 348 days.

(21) Appl. No.: 18/549,781

(22) PCT Filed: Apr. 13, 2022

(86) PCT No.: PCT/EP2022/059911
§ 371 (c)(1),
(2) Date: Sep. 8, 2023

(87) PCT Pub. No.: WO2022/223406
PCT Pub. Date: Oct. 27, 2022

(65) Prior Publication Data
US 2024/0149564 A1 May 9, 2024

(30) Foreign Application Priority Data

Apr. 19, 2021 (EP) ..................................... 21169057
Jul. 1, 2021 (EP) ..................................... 21183015

(51) Int. Cl.
B32B 17/10 (2006.01)
G02F 1/01 (2006.01)
(Continued)

(52) U.S. Cl.
CPC .. B32B 17/10504 (2013.01); B32B 17/10036 (2013.01); B32B 17/10211 (2013.01);
(Continued)

(58) Field of Classification Search
CPC ........ B32B 17/10504; B32B 17/10036; B32B 17/10211; B32B 17/10513;
(Continued)

(56) References Cited

U.S. PATENT DOCUMENTS

2006/0018000 A1 1/2006 Greer
2012/0026573 A1 2/2012 Collins et al.
(Continued)

FOREIGN PATENT DOCUMENTS

CN 109496277 A 3/2019
CN 111386194 A 7/2020
(Continued)

OTHER PUBLICATIONS

International Search Report as issued in International Patent Application No. PCT/EP2022/059911, dated Jun. 9, 2022.
Lee, J., et al., "Power Electronic Converter Topology with Regulable Transmittance of PDLC Applications," 2018 21ST International Conference on Electrical Machines and Systems (ICEMS), Oct. 2018, XP033451768, pp. 2437-2350.

*Primary Examiner* — William Choi
(74) *Attorney, Agent, or Firm* — CUSHMAN PARTNERS, LLC

(57) ABSTRACT

A method for controlling a glazing unit having electrically controllable optical properties, wherein the glazing unit includes a composite pane having an outer pane and an inner pane which are connected to one another via a thermoplastic intermediate layer, a functional element is arranged between the outer pane and the inner pane and has an active layer having electrically controllable optical properties between a first planar electrode and a second planar electrode, the optical properties are controlled by a control unit, wherein the control unit is connected to at least two transparent planar electrodes of the functional element, an electrical voltage is applied between the planar electrodes by the control unit, and an inverse function is used to determine a magnitude of the electrical voltage.

20 Claims, 3 Drawing Sheets

100

Figure 1:
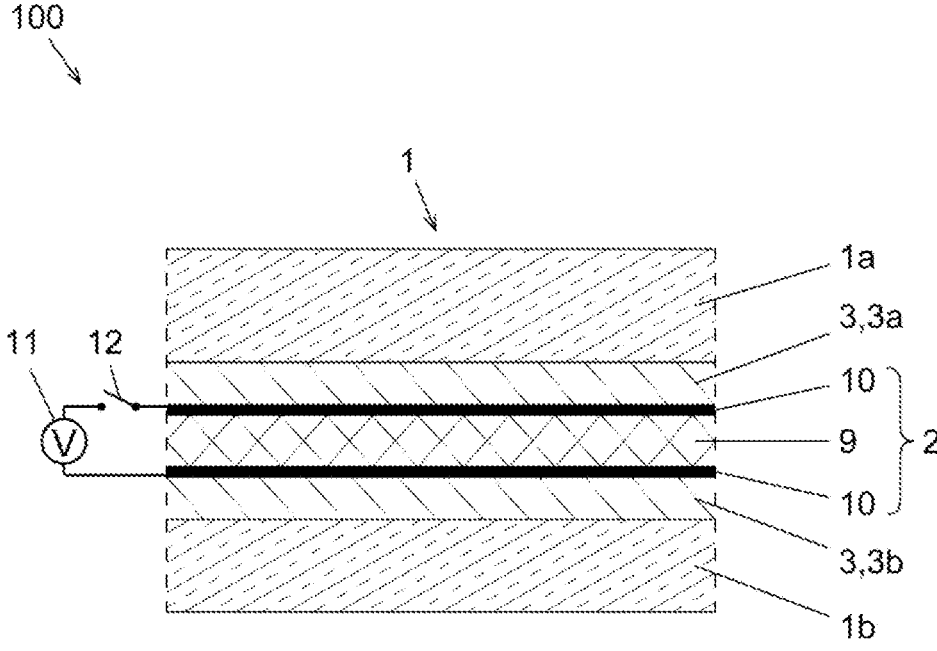

(51) Int. Cl.
    *B60J 1/00*         (2006.01)
    *B60J 3/04*         (2006.01)

(52) U.S. Cl.
    CPC .. *B32B 17/10513* (2013.01); *B32B 17/10532*
        (2013.01); *B32B 17/10761* (2013.01); *G02F*
        *1/0121* (2013.01); *B32B 2605/08* (2013.01);
        *B60J 1/001* (2013.01); *B60J 3/04* (2013.01)

(58) Field of Classification Search
    CPC ........ B32B 17/10532; B32B 17/10761; B32B
        2605/08; G02F 1/0121; B60J 1/001; B60J
                                       3/04
    USPC ........................................................ 359/245
    See application file for complete search history.

(56)               References Cited

U.S. PATENT DOCUMENTS

| 2014/0300945 A1 | 10/2014 | Parker |
| 2020/0133042 A1 | 4/2020 | Manz et al. |

FOREIGN PATENT DOCUMENTS

| CN | 111867828 A | 10/2020 |
| DE | 103 43 445 A1 | 4/2005 |
| EP | 0 876 608 B1 | 4/2002 |
| RU | 2743655 C1 | 2/2021 |
| WO | WO 2011/033313 A1 | 3/2011 |
| WO | WO 2012/007334 A1 | 1/2012 |
| WO | WO 2019/011891 A1 | 1/2019 |

1
2

METHOD FOR ELECTRICALLY CONTROLLING A FUNCTIONAL ELEMENT EMBEDDED IN A GLAZING UNIT

CROSS-REFERENCE TO RELATED APPLICATIONS

This application is the U.S. National Stage of PCT/EP2022/059911, filed Apr. 13, 2022, which in turn claims priority to European patent application number 21183015.3 filed Jul. 1, 2021 and European patent application number 21169057.3 filed Apr. 19, 2021. The content of these applications are incorporated herein by reference in their entireties.

The invention relates to a method for controlling a glazing unit having electrically controllable optical properties, to a glazing unit, and to a use of the glazing unit.

Functional elements having electrically controllable optical properties are used in the industrial production of glazing units. Such glazing units are frequently composite panes in which a functional element is embedded. The composite panes consist of at least one outer pane, an inner pane and an adhesive intermediate layer, which connects the outer pane to the inner pane in a planar manner. Typical intermediate layers are polyvinyl butyral films which, in addition to their adhesive properties, have high toughness and a high acoustic damping effect. The intermediate layer prevents the disintegration of the composite pane when damaged. The composite pane does crack but remains inherently stable.

Composite panes having electrically controllable optical properties are known from the prior art. Such composite panes contain a functional element, which typically contains an active layer between two planar electrodes. The optical properties, in particular the transmission of visible light, of the active layer can be changed by a voltage applied to the planar electrodes. An example of this are electrochromic functional elements known, for example, from US 20120026573 A1 and WO 2012007334 A1. Another example is suspended particle device (SPD) functional elements or polymer dispersed liquid crystal (PDLC) functional elements known, for example, from EP 0876608 B1 and WO 2011033313 A1. By applying voltage, the transmission of visible light can be controlled by electrochromic SPD/PDLC functional elements.

SPD and PDLC functional elements are commercially available as multilayer films. The planar electrodes required for applying a voltage are arranged between two PET carrier films. During the manufacture of the glazing unit, the functional element is cut to the desired size and shape from the multilayer film and embedded between the films of an intermediate layer. Via flat conductors, the planar electrodes are electrically conductively connected outside the composite pane to a control module (ECU). The control module is designed to apply an electrical voltage between the planar electrodes.

Windshields have been proposed in which an electrically controllable sun shield is realized by a functional element in order to replace the mechanically foldable sun visor in motor vehicles.

WO 2019/011891 A1 discloses a device for operating a functional element having electrically controllable optical properties.

However, a glazing unit with such a functional element has a temperature dependence of its transmission or also transparency. In many cases, the switchable functional elements have a characteristic curve which deviates significantly from a straight line and makes reproducible switching behavior difficult.

The object of the present invention is to provide an improved method in which the switching behavior of the transparency is improved.

The object of the present invention is achieved according to the invention by a method according to independent claim 1. Preferred embodiments of the invention emerge from the dependent claims.

The object is achieved according to the invention by a method for controlling a glazing unit having electrically controllable optical properties, wherein the glazing unit comprises a composite pane having an outer pane and an inner pane which are connected to one another via a thermoplastic intermediate layer. Furthermore, a functional element is arranged between the outer pane and the inner pane and has an active layer having electrically controllable optical properties between a first planar electrode and a second planar electrode, the optical properties being controlled by means of a control unit. For this purpose, the control unit is connected to the at least two transparent planar electrodes of the functional element so that an electrical voltage can be applied between the planar electrodes by means of the control unit. Since a nonlinear coherence is present between the electrical voltage and a transparency of the functional element, an inverse function is used to determine a magnitude of the electrical voltage. The inverse function can in particular be the inverse function of the characteristic of the adjustment of the transparency (also referred to as light transmittance) of the functional element.

The invention is based on the finding that the switching behavior of electrically switchable functional elements is temperature-dependent. An electrical voltage applied to the planar electrodes leads to a change in the optical properties, in particular transparency, which is the greater, the higher the temperature of the functional element or the composite pane is. If the inverse function is used as a temperature-dependent linearization function, a nonlinear calibration function can be linearized. In other words, the linearization function is the inverse function of the calibration function, in particular of the temperature-dependent calibration function. Thus, if the inverse function is used as a temperature-dependent linearization function, a switching state at a given temperature can be set precisely.

A temperature of the functional element can be ascertained by the control unit and a magnitude of the electrical voltage between the planar electrodes can be determined by means of the control unit depending on the temperature of the functional element or composite pane and applied to the functional element.

The invention provides a method for electrically controlling at least one functional element embedded in a glazing unit and having electrically controllable optical properties, in which the temperature of the functional element or of the composite pane is ascertained. The temperature can then be taken into account during activation of the functional element and a control signal for switching the functional element can be adjusted to the temperature. This results in a characteristic curve of the functional element that has an almost linear profile. A particular advantage of the invention consists in that the nonlinear behavior of the electrical voltage to the transparency of the functional element can be linearized and a temperature effect can thus be compensated.

In an advantageous embodiment, the control unit is suitable for determining an impedance of the active layer. Furthermore, the temperature of the functional element and/or composite pane can be determined by means of the impedance. This embodiment has the advantage that a temperature sensor can be dispensed with and the effort and costs of manufacturing the glazing unit are therefore reduced. At the same time, circuit complexity can be kept very low.

The current consumption of the functional element can be ascertained for determining the impedance. As a result, the impedance can be calculated as a ratio, in particular a quotient of voltage and a current ascertained during current consumption.

If the temperature of the functional element or of the composite pane is known, an electrical potential to be applied to a planar electrode can then be ascertained as a function of the temperature. In particular, the higher the ascertained temperature is, the lower is the electrical voltage. For this purpose, calibration data are stored in the control unit, for example a calibration function or calibration table which includes voltage values as a function of the temperature. Thus, the required voltage value can be ascertained by means of the control unit as a function of a desired switching state (for example 50%) of the transparency and the ascertained temperature (for example 60° C.) and can be applied to the planar electrodes.

The calibration data are preferably present as a continuous calibration curve so that a voltage value can be assigned to each value pair of temperature and switching state. The calibration curve can be created, for example, in that individual function values are known as a result of measurements, between which interpolation is carried out. In principle, it is also possible for the calibration data to be present in tabular form, wherein certain ranges of the temperature are each assigned a common voltage value. The latter is less preferred since during the transition from one temperature range to the other, a sudden change in the switching behavior can occur, which is irritating to users.

One development provides for the planar electrodes of the functional element to be formed free of insulation lines. The planar electrodes are designed to cover the entire surface, i.e., they each form a coherent, complete layer. They have no partitions or segments.

The electrical voltage applied between the planar electrodes can be a DC voltage or an AC voltage, wherein an AC voltage is preferred in particular in the case of a PDLC functional element.

According to the invention, the temperature of the functional element or of the composite pane is determined in order to adapt the voltage to be applied to this temperature. It is assumed here that the composite pane overall has a homogeneous temperature, i.e., the temperature of the functional element matches the temperature of other regions of the composite pane, which is typically at least approximately the case. Accordingly, the determination of the temperature of the composite pane corresponds at least approximately to the determination of the temperature of the functional element. The temperature of the functional element or of the composite pane can be from 30° C. to 80° C., in particular in the range from 40° C. to 60° C.

The method according to the invention can be implemented, for example, in software or hardware or in a mixed form of software and hardware, for example in the control unit.

The invention also comprises a glazing unit. The glazing unit and the method are described together, wherein explanations and preferred embodiments relate equally to glazing unit and method. If preferred features are described in connection with the method, this means that the glazing unit is preferably designed and is suitable accordingly. If, on the other hand, preferred features are described in connection with the glazing unit, this means that the method is also preferably carried out accordingly.

The glazing unit comprises the composite pane consisting of at least one outer pane and one inner pane which are connected to one another via a thermoplastic intermediate layer. The functional element is embedded in the thermoplastic intermediate layer. The glazing unit is provided for separating the interior space from the external environment in a window opening of, for example, a vehicle, a building or a room. In the context of the invention, the term "inner pane" is understood to mean the pane facing the interior space. Outer pane means the pane facing the external environment. The thermoplastic intermediate layer serves to connect the two panes.

The thermoplastic intermediate layer comprises at least one thermoplastic polymer, preferably ethylene vinyl acetate (EVA), polyvinyl butyral (PVB) or polyurethane (PU), or mixtures, or copolymers, or derivatives thereof, particularly preferably PVB. The intermediate layer is typically formed from a thermoplastic film. The thickness of the intermediate layer is preferably from 0.2 mm to 2 mm, particularly preferably from 0.3 mm to 1 mm.

The outer pane and the inner pane are preferably made of glass, in particular of soda-lime glass, which is customary for window panes. In principle, however, the panes can also be produced from other types of glass (for example borosilicate glass, quartz glass, aluminosilicate glass) or transparent plastics (for example polymethyl methacrylate or polycarbonate). The thickness of the outer pane and the inner pane can vary widely. Preferably, panes having a thickness in the range from 0.8 mm to 5 mm, preferably from 1.4 mm to 2.5 mm, are used, for example those with the standard thicknesses of 1.6 mm or 2.1 mm.

The outer pane, the inner pane and the thermoplastic intermediate layer can be clear and colorless, but also tinted or colored. A corresponding glazing unit used as a windshield must have sufficient light transmission in the central viewing area, preferably at least 70% in the main viewing area A according to ECE-R43. Independently of each other, the outer pane and the inner panes can be not prestressed, partially prestressed or prestressed. If at least one of the panes should be prestressed, this can be thermal or chemical prestressing.

The outer pane, the inner pane and/or the intermediate layer can have further suitable coatings known per se, for example anti-reflective coatings, non-stick coatings, anti-scratch coatings, photocatalytic coatings or sun protection coatings or low-e coatings.

The outer pane and the inner pane are laminated together via the intermediate layer, for example by autoclave processes, vacuum bag processes, vacuum ring processes, calendering processes, vacuum laminators, or combinations thereof. The outer pane and inner pane are usually connected under the effect of heat, vacuum and/or pressure.

The glazing unit comprises a functional element that has electrically controllable optical properties and is embedded in the intermediate layer. The functional element is typically arranged between at least two layers of thermoplastic material of the intermediate layer, wherein it is connected to the outer pane by the first layer and to the inner pane by the second layer.

Such a functional element comprises at least one active layer arranged between a first carrier film and a second carrier film. The active layer has the variable optical properties that can be controlled by an electrical voltage applied to the active layer. In the context of the invention, electrically controllable optical properties are understood to mean properties that are continuously controllable, but also properties that can be switched between two or more discrete states. The optical properties relate in particular to light transmission and/or scattering behavior. The functional element moreover comprises planar electrodes for applying the voltage to the active layer, which are preferably arranged between the carrier films and the active layer.

In an advantageous embodiment, the functional element is a PDLC functional element, in particular one that switches at least one region of the glazing unit from a transparent into an opaque state, and vice versa. The active layer of a PDLC functional element contains liquid crystals which are embedded in a polymer matrix. In a further preferred embodiment, the functional element is an SPD functional element. The active layer contains suspended particles, wherein the absorption of light through the active layer can be changed by applying a voltage to the planar electrodes.

The planar electrodes and the active layer are arranged substantially parallel to the surfaces of the outer pane and the inner pane. The planar electrodes are connected to an external voltage source. The electrical contact as well as the connection to the energy source of the active layer is realized by suitable connecting cables, for example flat conductors or foil conductors, which are optionally connected to the planar electrodes via so-called bus bars, for example strips of an electrically conductive material or electrically conductive imprints. The thickness of the functional element is, for example, from 0.4 mm to 1 mm.

The planar electrodes are preferably designed as transparent, electrically conductive layers. The planar electrodes preferably contain at least one metal, a metal alloy or a transparent conducting oxide (TCO). The planar electrodes can contain, for example, silver, gold, copper, nickel, chromium, tungsten, indium tin oxide (ITO), gallium-doped or aluminum-doped zinc oxide and/or fluorine-doped or antimony-doped tin oxide. The planar electrodes preferably have a thickness of 10 nm (nanometer) to 2 μm (micrometer), particularly preferably 20 nm to 1 μm, very particularly preferably 30 nm to 500 nm.

The invention also comprises a glazing unit of a vehicle or building, at least comprising a composite pane having electrically controllable optical properties. The composite pane comprises the outer pane and the inner pane, which are connected to one another via a thermoplastic intermediate layer, and into which a functional element having electrically controllable optical properties is embedded. The functional element has an active layer which is assigned transparent planar electrodes on both surfaces. Furthermore, the glazing unit comprises a control unit for electrically controlling the optical properties of the glazing unit according to the method according to the invention, which is connected to the planar electrodes of the functional element and is designed to apply an electrical voltage between the planar electrodes.

In a preferred embodiment, the functional element is a PDLC functional element, an SPD functional element or an electrochromic functional element.

In a preferred embodiment, the functional element is a PDLC (polymer-dispersed liquid crystal) functional element. The active layer of a PDLC functional element contains liquid crystals which are embedded in a polymer matrix. If no voltage is applied to the planar electrodes, the liquid crystals will be aligned in an unordered manner, which results in strong scattering of the light passing through the active layer. If a voltage is applied to the planar electrodes, the liquid crystals will align in a common direction and the transmission of light through the active layer is increased. However, other functional elements can also be used, the variability of whose optical properties is based on liquid crystals, for example PNLC (polymer-networked liquid crystal) functional elements.

In a further preferred embodiment, the active layer of the functional element is an electrochemically active layer. Such functional elements are known as electrochromic functional elements. The transmission of visible light is dependent on the extent to which ions are embedded in the active layer, wherein the ions are provided, for example, by an ion storage layer between the active layer and a planar electrode. Transmission can be influenced by the voltage applied to the planar electrodes, which causes migration of the ions. Suitable functional layers contain, for example, at least tungsten oxide or vanadium oxide.

In a preferred embodiment, the control unit comprises a DC-DC converter and/or an inverter. Since the on-board voltage of a vehicle is, for example, 12 to 14 V, it is not sufficient to operate a functional element. The control unit is therefore preferably equipped with a DC-DC converter. The DC-DC converter is provided to convert a DC voltage as a primary voltage into a higher secondary voltage (for example 65 V). In an advantageous embodiment, the secondary voltage can be 5 V to 70 V.

The inverter is provided to convert the secondary voltage into an AC voltage, wherein the secondary voltage is applied to the planar electrodes. This is particularly advantageous if the glazing unit is installed in a vehicle and connected to the on-board voltage of the vehicle. The control unit thus has the inverter in order to convert the DC voltage of a vehicle into an AC voltage. The AC voltage can be from 5 V to 50 V.

Furthermore, the control unit is provided for ascertaining a temperature of the functional element and, depending on the temperature, for determining a magnitude of the electrical voltage applied between the planar electrodes. Furthermore, the control unit is provided for determining the impedance of the active layer so that the temperature of the functional element is ascertained as a function of the impedance.

According to a further aspect of the invention, a vehicle, in particular a passenger car, with the glazing unit according to the invention is described.

A further aspect of the invention comprises the use of the glazing unit according to the invention in means of transportation on land, in the air or in water, in particular in motor vehicles, for example, as a windshield, rear pane, side pane and/or roof pane, and as a functional individual piece, and as a component in furniture, devices and buildings.

In the following, the invention is explained in more detail with reference to figures and exemplary embodiments. The figures are schematic representations and not to scale. The figures do not limit the invention in any way.

Figure 2:
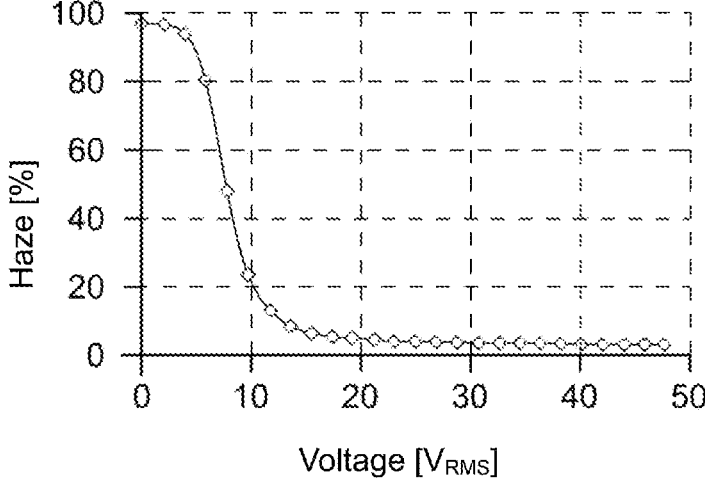
Figure 3:
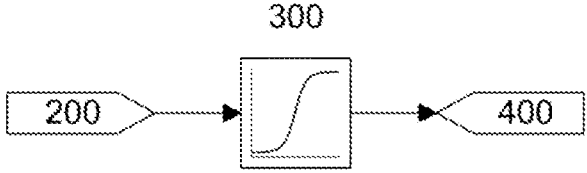
Figure 4:
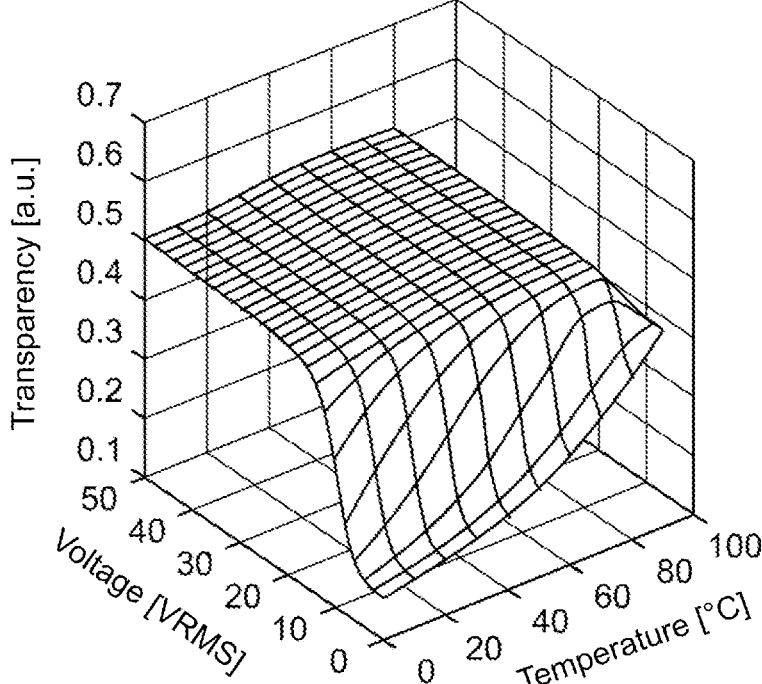
Figure 5:
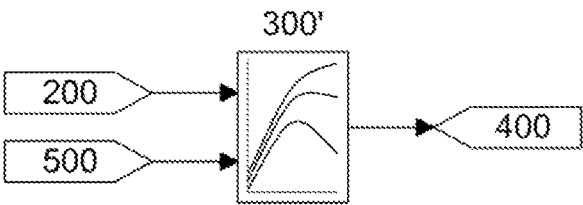
Figure 6:
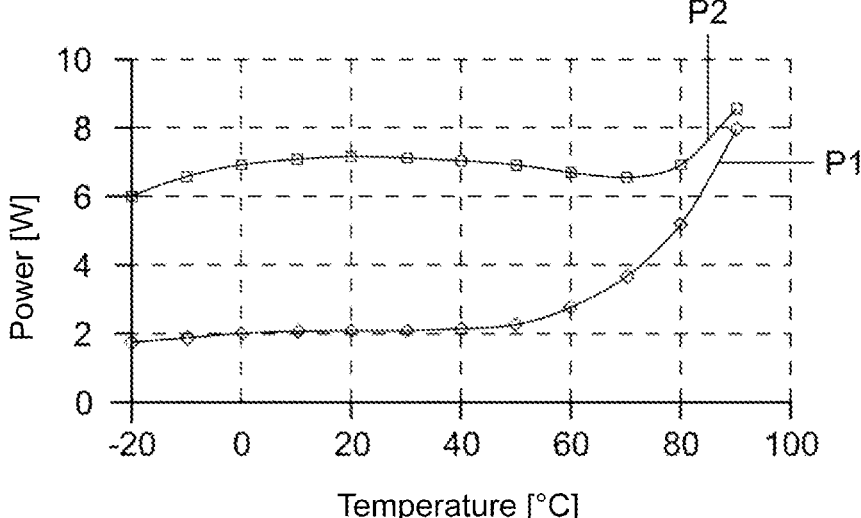
Figure 7:
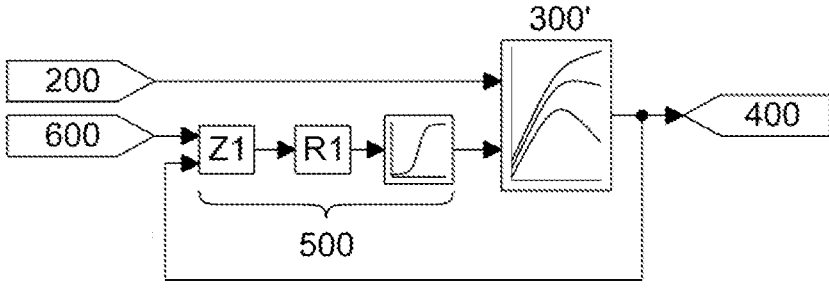

Shown are:

FIG. 1 shows a schematic representation of a glazing unit,

FIG. 2 shows a diagram of the haze of an electrically controllable functional element as a function of an electrical voltage applied to the planar electrodes of the functional element, FIG. 3 shows a schematic representation of an embodiment of a method according to the invention, FIG. 4 shows a diagram of the transparency of the electrically controllable functional element as a function of the electrical voltage and the temperature, FIG. 5 shows a schematic representation of a further embodiment of the method according to the invention, FIG. 6 shows a diagram of the power consumption as a function of the temperature, and FIG. 7 shows a schematic representation of a further embodiment of the method according to the invention.

In the exemplary embodiments, the described components each represent features of the invention that are to be considered independently of one another and which are also to be regarded as part of the invention individually or in a combination other than the combination shown.

Data with numerical values are generally not to be understood as exact values but also include a tolerance of +/−1% up to +/−10%.

FIG. 1 shows a schematic representation of a glazing unit 100, which may be installed, for example, in a motor vehicle or in a building. The glazing unit 100 comprises a composite pane 1. The composite pane 1 comprises an outer pane 1a and an inner pane 1b, which are connected to one another via an intermediate layer 3. The outer pane 1a has a thickness of 2.1 mm and consists of a soda-lime glass. The inner pane 1b has a thickness of 1.6 mm and consists of a soda-lime glass.

In a central region, the composite pane 1 is equipped with a functional element 2 embedded in the intermediate layer 3. The intermediate layer 3 comprises a total of three thermoplastic layers which are each formed by a thermoplastic film that has a thickness of 0.38 mm and is made of PVB. The first thermoplastic layer 3a is connected to the outer pane 1, the second thermoplastic layer 3b is connected to the inner pane 1b. The third thermoplastic layer in between surrounds the cut-to-size functional element 2 (PDLC multilayer film) in a substantially flush manner on all sides. The functional element 2 is thus completely embedded in the thermoplastic material and protected thereby.

FIG. 1 further shows the switched-on state of the glazing unit 100 with the functional element 2 embedded in the composite pane 1. The glazing unit 100 also comprises a control unit 11 (also referred to as ECU in a motor vehicle) which is electrically connected to the functional element 2 via a closed switch 12 so that an electrical voltage V can be applied to the functional element 2.

The electrical voltage V applied between two planar electrodes 10 of the functional element can be a DC voltage or an AC voltage. In the case of a PDLC functional element, the voltage is an AC voltage. The control unit 11 is equipped with a DC-DC converter, which converts an on-board voltage (primary voltage) into a DC voltage of higher magnitude, for example 65 V (secondary voltage). The secondary voltage must be sufficiently high in order to realize a switching state of the functional element 2 of 100%. The control unit 11 is moreover equipped with an inverter which converts the secondary voltage into an AC voltage.

The optical properties of the glazing unit 100 are controlled by means of the control unit 11. To this end, control unit 11 is electrically conductively connected to the two transparent planar electrodes 10 of the functional element 2.

The functional element 2 is a multilayer film consisting of an active layer 9, two planar electrodes 10 and two carrier films. Such multilayer films are commercially available as PDLC multilayer films. The active layer 9 is arranged between the two planar electrodes 10. The active layer 9 contains a polymer matrix with therein dispersed liquid crystals, which align depending on the electrical voltage applied to the planar electrodes 10, whereby the optical properties can be controlled. The carrier films consist of PET and have a thickness of about 0.125 mm. The carrier films are provided with a coating made of ITO with a thickness of about 100 nm that faces the active layer 9, and form the planar electrodes 10. The planar electrodes 10 are formed free of insulation lines. They are designed to cover the entire surface, i.e., they each form a coherent, complete layer. They have no partitions or segments.

FIG. 2 shows a diagram of the haze of a PDLC functional element plotted against a voltage $V_{RMS}$ applied to the planar electrodes 10 at room temperature of about 25° C. and without the method according to the invention being used. The measurements shown in the diagram form a calibration function of the functional element 2, in particular of the temperature-dependent calibration function. The diagram clearly shows that the haze does not behave linearly with the applied voltage. In order to reduce the haze by 50%, a voltage must be reduced by more than 50%.

FIG. 3 shows a schematic representation of an embodiment of a method according to the invention. In order to obtain a linear behavior of the optical properties of the functional element 2, an inverse function 300 is applied to a desired value 200 of the haze. The inverse function 300 is determined from the calibration function of the functional element 2. This results in a voltage value 400 which can be applied to the planar electrodes 10 in order to achieve a desired transparency 200 of the functional element 2.

FIG. 4 shows a diagram of the transparency of the electrically controllable functional element 2 as a function of the electrical voltage $V_{RMS}$ and the temperature of the functional element 2. The diagram clearly shows a temperature dependence of the transparency.

FIG. 5 shows a schematic representation of a further embodiment of the method according to the invention. Since the transparency of the functional element 2 is temperature-dependent, a temperature-dependent inverse function 300' is applied as a temperature-dependent linearization function in order to determine a voltage value 400. For this purpose, a temperature value 500 of the functional element 2 or of the composite pane 1 is determined.

FIG. 6 shows a diagram of the power consumption (Power) as a function of the temperature of the functional element 2 or of the composite pane 1. The power consumption is used here as a measure of current consumption. Both the apparent power P2 (stemming from the apparent current) and the active power P1 (stemming from the active current) are plotted. The apparent power P2 is composed of active power P1 and reactive power. It can be seen that the apparent power (or the apparent current) is not suitable for determining a temperature, because its temperature-dependent curve does not correspond to a bijective function: The same power value (or current value) can occur at more than one temperature. In contrast, the active power P1 (or the active current) is described by a bijective function. It can therefore be easily used to ascertain the temperature.

The diagram also shows that the current consumption (expressed here by the power consumption) and thus the impedance is very temperature-dependent only starting from a certain limit temperature of about 60° C., while the temperature-dependent change is comparatively small below the limit temperature, for example at 40° C. or 50° C.

FIG. 7 shows a schematic representation of a further embodiment of the method according to the invention. The temperature value 500 of the functional element 2 or of the composite pane 1 can be calculated or at least estimated through an impedance, in particular a resistance, of the active layer 9 of the functional element 2. The impedance, in particular the resistance, is calculated from the power consumption of FIG. 6 and the (output) voltage value 400. A current consumption of the functional element 2 can be ascertained through the power consumption of the functional element 2. The current consumption results in a current value 600. The impedance Z1, in particular the resistance R1, of the active layer 9 of the functional element 2 is calculated from the ratio, in particular the quotient, of the voltage value 400 to the current value 600.

Analogously to FIG. 5, the temperature-dependent inverse function 300' is then applied as a temperature-dependent linearization function in order to determine a voltage value 400 so that an electrical potential can be applied to one of the planar electrodes 10 as a function of the temperature of the functional element 2.

A great advantage of the invention is that the switching behavior of the glazing unit is improved by ascertaining the temperature on the basis of the current value.

LIST OF REFERENCE SIGNS

1 Glazing unit
1*a* Outer pane
1*b* Inner pane
2 Functional element
3 Intermediate layer
3*a* First thermoplastic layer
3*b* Second thermoplastic layer
9 Active layer
10 Planar electrodes
11 Control unit
12 Switch
100 Glazing unit
200 Transparency value
300, 300' Inverse function
400 Voltage value
500 Temperature value
600 Current value

The invention claimed is:

1. A method for controlling a glazing unit having electrically controllable optical properties, wherein the glazing unit comprises a composite pane having an outer pane and an inner pane which are connected to one another via a thermoplastic intermediate layer, a functional element is arranged between the outer pane and the inner pane and has an active layer having electrically controllable optical properties between a first planar electrode and a second planar electrode, the method comprising controlling the optical properties by means of a control unit, wherein the control unit is connected to at least two transparent planar electrodes of the functional element, and applying an electrical voltage between the at least two transparent planar electrodes by means of the control unit, wherein an inverse function is used to determine a magnitude of the electrical voltage, and wherein an impedance of the active layer is determined by means of the control unit.

2. The method according to claim 1, wherein the inverse function is used as a temperature-dependent linearization function, wherein the temperature-dependent linearization function is the inverse function of a calibration function of the functional element.

3. The method according to claim 1, wherein a temperature of the functional element is ascertained by the control unit and a magnitude of the electrical voltage between the at least two transparent planar electrodes is determined as a function of the temperature of the functional element by means of the control unit and applied.

4. The method according to claim 1, wherein the temperature of the functional element and/or composite pane is determined by means of the impedance.

5. The method according to claim 4, wherein the impedance is determined from a ratio of the electrical voltage to a current of the functional element.

6. The method according to claim 1, wherein a current consumption of the functional element is ascertained.

7. The method according to claim 1, wherein the at least two transparent planar electrodes are free of insulation lines.

8. The method according to claim 1, wherein the electrical voltage applied between the at least two transparent planar electrodes is a DC voltage or an AC voltage.

9. The method according to claim 1, wherein the temperature of the functional element or of the composite pane is from 30° C. to 80° C.

10. The method according to claim 9, wherein the temperature of the functional element or of the composite pane is from 40° C. to 60° C.

11. A glazing unit having electrically controllable optical properties, comprising a composite pane having an outer pane and an inner pane which are connected to one another via a thermoplastic intermediate layer, an electrically controllable functional element which is arranged between the outer pane and the inner pane and has an active layer having electrically controllable optical properties between a first planar electrode and a second planar electrode, a control unit for controlling the optical properties of the functional element, wherein the control unit is provided to carry out a method according to claim 1.

12. The glazing unit according to claim 11, wherein the functional element is a PDLC functional element, an SPD functional element or an electrochromic functional element.

13. The glazing unit according to claim 11, wherein the control unit comprises a DC-DC converter and/or an inverter.

14. The glazing unit according to claim 11, wherein the control unit is provided for ascertaining a temperature of the functional element and, depending on the temperature, for determining a magnitude of the electrical voltage applied between the first and second planar electrodes.

15. The glazing unit according to claim 11, wherein the control unit is provided for determining the impedance of the active layer and, depending on the impedance, for ascertaining the temperature of the functional element.

16. A vehicle with a glazing unit according to claim 11.

17. The vehicle according to claim 16, wherein the vehicle is a passenger car.

18. A method for controlling a glazing unit having electrically controllable optical properties, wherein the glazing unit comprises a composite pane having an outer pane and an inner pane which are connected to one another via a thermoplastic intermediate layer, a functional element is arranged between the outer pane and the inner pane and has an active layer having electrically controllable optical properties between a first planar electrode and a second planar electrode, the method comprising controlling the optical properties by means of a control unit, wherein the control unit is connected to at least two transparent planar electrodes of the functional element, and applying an electrical voltage between the at least two transparent planar electrodes by means of the control unit, wherein an inverse function is used to determine a magnitude of the electrical voltage, and wherein the inverse function is used as a temperature-dependent linearization function, wherein the temperature-dependent linearization function is the inverse function of a calibration function of the functional element.

19. The method according to claim 18, wherein a temperature of the functional element is ascertained by the control unit and a magnitude of the electrical voltage between the at least two transparent planar electrodes is determined as a function of the temperature of the functional element by means of the control unit and applied.

20. The method according to claim 18, wherein a current consumption of the functional element is ascertained.

*     *     *     *     *